(12) United States Patent
Sachs

(10) Patent No.: US 7,866,624 B2
(45) Date of Patent: Jan. 11, 2011

(54) HEAT SENSITIVE RELEASE VALVE FOR CRYOGENIC TANK

(75) Inventor: Christian Sachs, Mainz (DE)

(73) Assignee: GM Global Technology Operations, Inc., Detroit, MI (US)

( * ) Notice: Subject to any disclaimer, the term of this patent is extended or adjusted under 35 U.S.C. 154(b) by 1268 days.

(21) Appl. No.: 10/967,795

(22) Filed: Oct. 18, 2004

(65) Prior Publication Data
US 2006/0081798 A1  Apr. 20, 2006

(51) Int. Cl.
*F16K 31/64* (2006.01)

(52) U.S. Cl. .................. 251/11; 251/243; 251/335.2

(58) Field of Classification Search .............. 251/11, 251/243, 335.2
See application file for complete search history.

(56) References Cited

U.S. PATENT DOCUMENTS

| | | | | |
|---|---|---|---|---|
| 3,613,732 A | * | 10/1971 | Willson et al. ............. | 251/11 |
| 3,682,142 A | * | 8/1972 | Newkirk ..................... | 123/3 |
| 3,709,431 A | * | 1/1973 | Channell et al. ........... | 251/11 |
| 3,760,832 A | * | 9/1973 | McGowen et al. ......... | 251/11 |
| 3,858,611 A | * | 1/1975 | Thayer ....................... | 251/11 |
| 4,172,581 A | * | 10/1979 | Lobach ....................... | 251/11 |
| 4,406,129 A | * | 9/1983 | Mills ........................ | 137/539.5 |
| 4,836,496 A | * | 6/1989 | Abujudom et al. ........ | 251/11 |
| 5,033,713 A | * | 7/1991 | Thorsen et al. ............ | 251/243 |
| 5,040,567 A | * | 8/1991 | Nestler et al. .............. | 251/11 |
| 6,622,758 B2 | * | 9/2003 | Drube et al. ............... | 251/149.9 |

* cited by examiner

*Primary Examiner*—John Bastianelli
(74) *Attorney, Agent, or Firm*—John A. Miller; Miller IP Group, PLC

(57) ABSTRACT

A heatable cryo-valve for a cryogenic tank storing liquid hydrogen. In one embodiment, the cryo-valve includes a valve plate mounted to a valve body by a spring. The spring forces the valve plate against a valve seat to prevent hydrogen from flowing through the cryo-valve when the valve is in a closed position. A resistive heating device is position proximate the valve plate. An electrical current applied to the heating device causes the device to expand, which pushes the device against the valve plate and against the bias of the spring to move the valve plate off of the valve seat and allow hydrogen to flow therethrough. The cryo-valve can be designed so that the heating device does not come in direct contact with the liquid hydrogen.

25 Claims, 1 Drawing Sheet

HEAT SENSITIVE RELEASE VALVE FOR CRYOGENIC TANK

BACKGROUND OF THE INVENTION

1. Field of the Invention

This invention relates generally to a cryogenic tank and, more particularly, to a cryogenic tank that employs a heat sensitive cryo-valve, where the tank has particular application for storing liquid hydrogen in a fuel cell system.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Many fuel cells are typically combined in a fuel cell stack to generate the desired power. For example, a typical fuel cell stack for a vehicle may have two hundred stacked fuel cells. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

In an automotive fuel cell application, the hydrogen is sometimes stored in a cryogenic tank on the vehicle, where the hydrogen is a liquid at very cold temperatures, such as 25° K. The cryogenic tank typically includes an inner tank and an outer tank having a vacuum and a multi-layer insulation (MLI) therebetween to limit heat penetration into the inner tank to maintain the liquid hydrogen in its supercold state. State of the art cryogenic hydrogen storage tanks on vehicles include a mechanical cryo-valve that selectively allows the hydrogen to be removed from the tank through a pipe. Cryo-valves are typically discreet valves in that they are entirely open or entirely closed. If no hydrogen is demanded, the valve is closed. Due to its size and construction, the control unit for the cryo-valve is positioned outside of the tank. Additionally, measures are taken to prevent ice forming condensation to occur on the valve. The cryo-valve typically includes a long valve stem to actuate the valve, which minimizes the heat path caused by the intrusion into the tank. Therefore, cryo-valves typically have a large mass and complex design. The cryo-valve could also operate as a pressure release valve for releasing pressure from the tank. However, a separate pressure release valve is typically provided for this purpose.

FIG. 1 is a plan view of a known cryogenic tank 10 including an outer tank 12 having a vacuum and an MLI and an inner tank 14, where the inner tank 14 stores liquid hydrogen at a low temperature. Additional devices (not shown), such as a pressure release valve and a filling line, would also be included with the tank 10. Hydrogen is emitted from the inner tank 14 through a pipe 16 to the fuel cell stack (not shown). The tank 10 includes a cryo-valve 18 that closes and opens the hydrogen path through the pipe 16 in response to a control signal. The cryo-valve 18 includes a valve stem 20 that actuates a valve plate (not shown) to open and close an opening in the pipe 16. A coil 22 controls the position of the valve stem 20. The length of the stem 20 minimizes the heat loss through the cryo-valve 18.

The inner tank 14 is heated by heat radiation and heat conduction to the environment through the outer tank 12. The heat radiation and heat conduction can be reduced by the combination of vacuum and the MLI, but cannot be completely prevented. Additionally, heat from the environment flows through the pipe 16 to the tank 14 and heats the liquid hydrogen therein. Also, heat from the environment gains access to the tank 14 through the cryo-valve 18.

Initially, the tank 14 is filled with liquid hydrogen having a temperature in equilibrium with the environmental pressure (1 bar). As the temperature of the hydrogen within the tank 14 increases, the pressure within the tank 14 increases. However, the pressure within the tank 14 is limited to a critical pressure level, which is the boil-off pressure. If the pressure within the tank 14 reaches the boil-off pressure, hydrogen must be released from the tank 14 in order to reduce the pressure. The cryo-valve 18 could also act as a pressure release valve for this purpose. The time from when the tank 14 is completely filled with hydrogen and the cryo-valve 18 is closed thereafter to when the boil-off pressure is reached in the tank 14 is the autonomy time. Because vehicles are sometimes not operated for extended periods of time, it is desirable to maximize the autonomy time by minimizing the heat losses from the tank 14.

It would be desirable to decrease the heat losses through the cryo-valve in a cryogenic tank, reduce the weight of the cryo-valve, and decrease the cost and complexity of the cryo-valve.

SUMMARY OF THE INVENTION

In accordance with the teachings of the present invention, a heatable cryo-valve for a cryogenic storage tank is disclosed, where the tank has particular application for storing liquid hydrogen in a fuel cell system. In one embodiment, the cryo-valve includes a valve plate mounted within a valve body by a spring. The spring forces the valve plate against a valve seat element to prevent hydrogen from flowing through the cryo-valve when the valve is in a closed position. A resistive heating device is positioned proximate the valve plate. An electrical current applied to the heating device causes the device to expand, which pushes the device against the valve plate and against the bias of the spring to move the valve plate off of the valve seat element and allow hydrogen to flow therethrough. The cryo-valve can be designed so that the heating device does not come in direct contact with the liquid hydrogen. In one alternate embodiment, a rocker is positioned proximate the valve plate and the heating device is positioned within a diaphragm in the valve body. When the heating device is heated, the device expands and pushes against the rocker, which pushes against the valve plate to open the valve.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a heatable cryo-valve for a cryogenic tank is merely exemplary in nature, and is in no way intended to limit the invention or its applications or uses. For example, the discussion herein concerns a cryogenic tank for storing hydrogen in a fuel cell system on a vehicle. However, the cryo-valve of the invention has application for other cryogenic tanks for storing other materials for other purposes.

Figure 1:
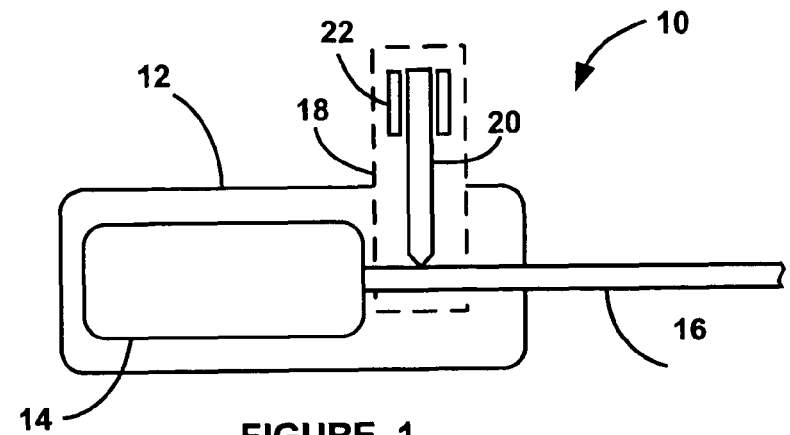
FIG. 1 is a plan view of a known cryogenic storage tank for storing liquid hydrogen.
Figure 2:
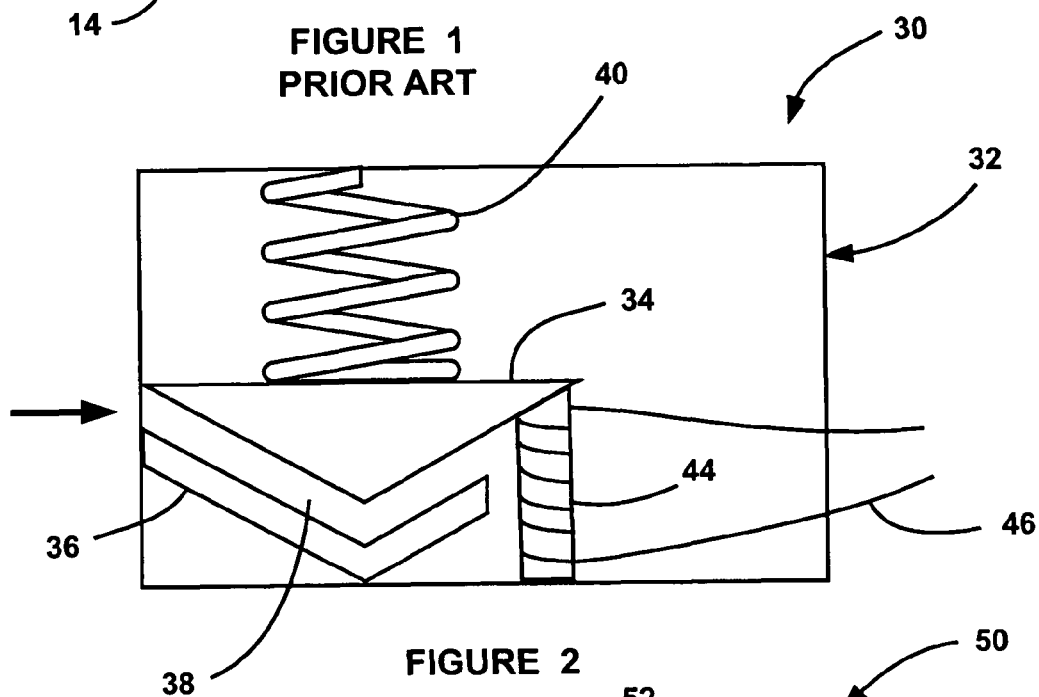
FIG. 2 is a plan view of a heatable cryo-valve for the type of cryogenic tank shown in FIG. 1, according to one embodiment of the present invention.

FIG. 2 is a plan view of a cryo-valve 30, according to an embodiment of the present invention, that can replace the cryo-valve 18 in the cryogenic tank 10 so as to limit heating of the hydrogen stored within the inner tank 14 for reasons that will become apparent from the discussion below. The cryo-valve 30 is positioned within the outer tank 12 and is held at the temperature of the liquid within the inner tank 14. The cryo-valve 30 is a sealed unit that includes a valve body 32 or housing. A valve plate 34 and a valve seat element 36 are positioned within the valve body 32. A gap between the valve plate 34 and the element 36 defines a flow channel 38 through which the liquid hydrogen flows through the cryo-valve 30 from the inner tank 14. An inlet end of the flow channel 38 would be coupled to the pipe 16 proximate the inner tank 14, and an outlet end of the flow channel 38 would be coupled to an output end of the pipe 16.

A spring 40 is mounted to an inner wall of the valve body 32 and a top surface of the valve plate 34. The bias of the spring 40 pushes the valve plate 34 against the seat element 36 to close off the flow channel 38 when the cryo-valve 30 is in its closed position so that no hydrogen flows through the pipe 16. This is the default position of the cryo-valve 30, i.e., normally closed, for safety purposes.

According to the invention, the cryo-valve 30 includes a heatable element 44 positioned proximate the valve plate 34 and the flow channel 38, as shown. The heatable element 44 is wound with an electrical wire 46 that receives an electrical current to heat the element 44 and cause it to expand. The heatable element 44 can be made of a material having a high thermal expansion coefficient. In one embodiment, the element 44 is a rod, such as an iron rod, however, this is by way of a non-limiting example in that any heat expandable shape and material suitable for the purposes described herein can be used.

When hydrogen is removed from the inner tank 14, such as for example, for feeding the anode side of a fuel cell stack in a vehicle, a suitable electrical current is provided on the wire 46 that causes the element 44 to expand. As the element 44 expands, it pushes against the valve plate 34 against the bias of the spring 40. By providing a large enough current, the heat expansion properties of the element 44 causes the valve plate 34 to lift off of the seat element 36 and open the flow channel 38 to allow hydrogen to flow therethrough. Because the only part of the cryo-valve 30 that extends into the ambient environment is the wire 46, it is the only source of heat available from the environment through the cryo-valve 30, and thus, the heat flow through the cryo-valve 30 is very limited.

Other heating mechanisms for the element 44 can also be used, such as radiation or direct heat bridges. Also, bimetallic springs can be used for the heatable element 44. Bimetal springs expand or bend when heated as a result of the thermal coefficients of the metals being used. Expansion of the spring will open the valve plate 34. The bimetal spring can also be designed to replace the spring 40 for the purposes discussed herein.

FIG. 2 is intended to be a general representation of a cryo-valve that operates in the manner discussed herein. One of ordinary skill in the art will recognize that many other configurations of the cryo-valve that operate on the principle discussed above can be provided within the spirit and scope of the present invention. For example, the spring 40, the valve plate 34 and the heatable element 44 can be reconfigured so that the valve is in a normally closed position when the heatable element 44 is heated for applications other than fuel cell applications.

As discussed above, the heatable element 44 is positioned proximate the flow channel 38 in the embodiment of FIG. 2. Thus, liquid hydrogen comes in contact with the element 44. The liquid hydrogen operates to cool the heatable element 44. By cooling the heatable element 44, it may undesirably contract and close or reduce the flow channel 38. Further, the element 44 may heat and evaporate the hydrogen flowing out of the flow channel. According to another embodiment of the invention, the flow channel 38 is designed so that the heatable element 44 does not come in direct contact with the liquid hydrogen.

Figure 3:
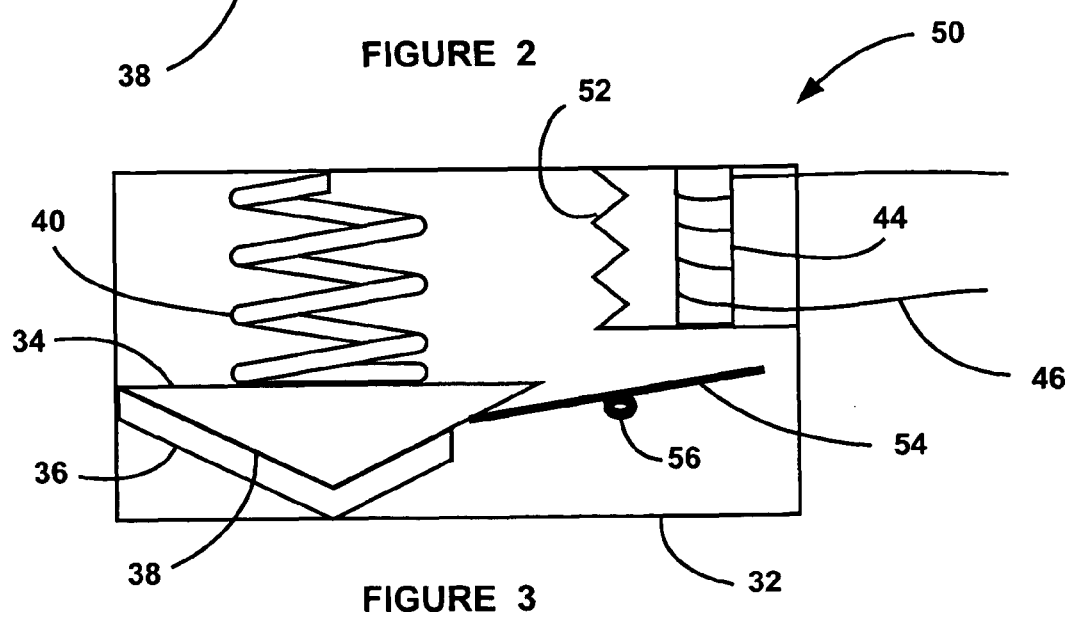
FIG. 3 is a plan view of a heatable cryo-valve for the type of cryogenic tank shown in FIG. 1, according to another embodiment of the present invention.

FIG. 3 is a plan view of a cryo-valve 50 that removes the heatable element 44 from the flow channel 38 and also prevents the heatable element 44 from coming in direct contact with the liquid hydrogen, according to another embodiment of the present invention. In the cryo-valve 50, like elements are identified by the same reference numeral as the cryo-valve 30. Particularly, the element 44 is positioned within a diaphragm 52 that is isolated from the flow of the liquid hydrogen. In this embodiment, the element 44 is shown in its unheated condition, where the spring 40 forces the valve plate 34 against the valve seat 36 to close off the flow channel 38.

One end of a rocker plate 54 is positioned against the valve plate 34, as shown. When the element 44 is heated by the electrical current on the wire 46, it expands and comes in contact with an opposite end of the rocker plate 54 through the diaphragm 52. The rocker plate 54 pivots on a pivot roller 56 providing leverage to push the valve plate 34 against the bias of the spring 40 and open the flow channel 38. Because the element 44 is positioned within the diaphragm 52, some thermal protection is provided so that the liquid hydrogen does not significantly cool down the element 44. The diaphragm 52 is mounted to the valve body 32 by any suitable technique that allows it to expand with the expanding element 44.

The cryo-valves 30 and 50 are lighter and less complex than the cryo-valves known in the art, and therefore, less costly.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A valve for controlling a cryogenic flow medium from a tank, said valve comprising:
    a valve body;
    a valve plate positioned within the valve body;
    a valve seat element positioned in the valve body adjacent to the valve plate and defining a flow channel therebetween;
    a spring mounted to the valve plate and the valve body, said spring having a spring bias that forces the valve plate against the valve seat to close the flow channel; and
    a heating element positioned proximate to the valve plate, wherein the heating element is heated for causing the heating element to expand and move the valve plate away from the valve seat against the bias of the spring to open the flow channel and allow the cryogenic medium to flow therethrough, wherein the valve is a cryo-valve associated with a cryogenic tank, said cryogenic tank including an insulating layer, said cryo-valve being position within the insulative layer so that only wires associated with the crvo-valve extend out of the insulative layer.

2. The valve according to claim 1 wherein the heating element is wound with an electrical wire, wherein an electrical current is applied to the wire to heat the heating element.

3. The valve according to claim 2 wherein the heating element is a rod.

4. The valve according to claim 1 wherein the heating element is in contact with the valve plate and the valve body.

5. The valve according to claim 1 further comprising a diaphragm, said heating element being positioned within the diaphragm and not in direct contact with the flow medium.

6. The valve according to claim 1 wherein the flow channel is designed so that the heating element does not come in direct contact with the flow medium.

7. The valve according to claim 1 further comprising a rocker plate positioned in contact with the valve plate and a diaphragm mounted to the valve body, said heating element being positioned within the diaphragm and being heated to force the rocker plate to move the valve plate against the bias of the spring and open the flow channel.

8. The valve according to claim 1 wherein the flow medium is liquid hydrogen for a fuel cell system.

9. The valve according to claim 8 wherein the cryogenic tank and the fuel cell system are on a vehicle.

10. A valve for controlling a cryogenic flow medium from a tank, said valve comprising:
    a valve plate;
    a valve seat element positioned adjacent to the valve plate and defining a flow channel therebetween; and
    a heating element positioned proximate to the valve plate, wherein the heating element is heated for causing the heating element to expand and move the valve plate relative to the valve seat element to open and close the flow channel and allow the cryogenic medium to flow therethrough, wherein the valve is a cryo-valve associated with a cryogenic tank, said cryogenic tank including an outer insulative layer, said cryo-valve being position within the insulative layer so that only wires associated with the cryo-valve extend out of the insulating layer.

11. The valve according to claim 10 wherein the heating element is wound with an electrical wire, wherein an electrical current is applied to the wire to heat the heating element.

12. The valve according to claim 11 wherein the heating element is a rod.

13. The valve according to claim 10 wherein the heating element is in contact with the valve plate.

14. The valve according to claim 10 further comprising a diaphragm, said heating element being positioned within the diaphragm and not in direct contact with the flow medium.

15. The valve according to claim 10 wherein the flow channel is designed so that the heating element does not come in direct contact with the flow medium.

16. The valve according to claim 10 wherein the flow medium is liquid hydrogen for a fuel cell system.

17. The valve according to claim 16 wherein the cryogenic tank and the fuel cell system are on a vehicle.

18. A cryo-valve for controlling the flow of liquid hydrogen from a cryogenic tank, said cryo-valve comprising:
    a valve body;
    a valve plate positioned within the valve body;
    a valve seat element positioned in the valve body adjacent to the valve plate and defining a flow channel therebetween;
    a spring mounted to the valve plate and the valve body, said spring having a spring bias that forces the valve plate against the valve seat to close the flow channel; and
    a heating rod positioned proximate to the valve plate and being wound with a wire, wherein an electrical current is applied to the wire to heat the heating rod for causing the heating rod to expand and move the valve plate away from the valve seat against the bias of the spring to open the flow channel, and wherein the cryo-valve is completely contained within an insulating layer of the cryogenic tank except for the wire, wherein the flow channel is designed so that the heating rod does not come in direct contact with the liquid hydrogen.

19. The cryo-valve according to claim 18 wherein the heating rod is in contact with the valve plate and the valve body.

20. The valve according to claim 18 further comprising a diaphragm, said heating rod being positioned within the diaphragm and not in direct contact with the liquid hydrogen.

21. The cryo-valve according to claim 18 further comprising a rocker plate positioned in contact with the valve plate and a diaphragm mounted to the valve body, said heating rod being positioned within the diaphragm and being heated to force the rocker plate to move the valve plate against the bias of the spring and open the flow channel.

22. The cryo-valve according to claim 18 wherein the cryogenic tank is part of a fuel cell system on a vehicle.

23. A cryo-valve for controlling the flow of liquid hydrogen from a cryogenic tank, said cryo-valve comprising:
    a valve body;
    a valve plate positioned within the valve body;
    a valve seat element positioned in the valve body adjacent to the valve plate and defining a flow channel therebetween;
    a spring mounted to the valve plate and the valve body, said spring having a spring bias that forces the valve plate against the valve seat to close the flow channel;
    a heating rod positioned proximate to the valve plate and being wound with a wire, wherein an electrical current is applied to the wire to heat the heating rod for causing the heating rod to expand and move the valve plate away from the valve seat against the bias of the spring to open the flow channel, and wherein the cryo-valve is completely contained within an insulating layer of the cryogenic tank except for the wire; and a diaphragm, said heating rod being positioned within the diaphragm and not in direct contact with the liquid hydrogen.

24. A cryo-valve for controlling the flow of liquid hydrogen from a cryogenic tank, said cryo-valve comprising:
a valve body;
a valve plate positioned within the valve body;
a valve seat element positioned in the valve body adjacent to the valve plate and defining a flow channel therebetween;
a spring mounted to the valve plate and the valve body, said spring having a spring bias that forces the valve plate against the valve seat to close the flow channel;
a heating rod positioned proximate to the valve plate and being wound with a wire, wherein an electrical current is applied to the wire to heat the heating rod for causing the heating rod to expand and move the valve plate away from the valve seat against the bias of the spring to open the flow channel, and wherein the cryo-valve is completely contained within an insulating layer of the cryogenic tank except for the wire; and
a rocker plate positioned in contact with the valve plate and a diaphragm mounted to the valve body, said heating rod being positioned within the diaphragm and being heated to force the rocker plate to move the valve plate against the bias of the spring and open the flow channel.

25. A cryo-valve for controlling the flow of liquid hydrogen from a cryogenic tank, said cryo-valve comprising:
a valve body;
a valve plate positioned within the valve body;
a valve seat element positioned in the valve body adjacent to the valve plate and defining a flow channel therebetween;
a spring mounted to the valve plate and the valve body, said spring having a spring bias that forces the valve plate against the valve seat to close the flow channel; and
a heating rod positioned proximate to the valve plate and being wound with a wire, wherein an electrical current is applied to the wire to heat the heating rod for causing the heating rod to expand and move the valve plate away from the valve seat against the bias of the spring to open the flow channel, and wherein the cryo-valve is completely contained within an insulating layer of the cryogenic tank except for the wire, and wherein the cryogenic tank is part of a fuel cell system on a vehicle.

* * * * *